United States Patent [19]

Hassan

[11] Patent Number: 5,133,585
[45] Date of Patent: Jul. 28, 1992

[54] VISOR FOR AUTOMOBILES

[76] Inventor: Shawky A. Hassan, 1146 S. Linden Rd., Flint, Mich. 48504

[21] Appl. No.: 587,811

[22] Filed: Sep. 20, 1990

[51] Int. Cl.⁵ .................................................. B60J 3/02
[52] U.S. Cl. .................................. 296/97.5; 296/97.8; 160/370.2
[58] Field of Search .................. 296/97.8, 97.5, 97.4, 296/97.6; 160/370.2

[56] References Cited

U.S. PATENT DOCUMENTS 2,237,700  4/1941  Goldman .............................. 296/97.8
2,747,927  5/1956  Burkhead ............................ 296/97.8
3,584,910  6/1971  Lupul ................................. 296/97.6

FOREIGN PATENT DOCUMENTS 119416  5/1989  Japan ................................. 296/97.8

Primary Examiner—Robert R. Song
Attorney, Agent, or Firm—Gifford, Groh, Sprinkle, Patmore and Anderson

[57] ABSTRACT

A visor for a vehicle is provided with a shade which when extended protects the interior of the vehicle from the sun.

7 Claims, 2 Drawing Sheets

VISOR FOR AUTOMOBILES

BACKGROUND OF THE INVENTION

I. Field of the Invention

The present invention relates to automotive visors and, more particularly, to a visor which houses a spring-action shade for shading the interior of automotive vehicles.

II. Description of the Prior Art

Direct sunlight makes the vehicle's interior very uncomfortable for the occupant when first entering it, until the air conditioning or air flow from the vehicle's movement dissipates the excessive heat.

It has long been known, especially in the southern states, that covering the steering wheel and other parts of an automotive vehicle's interior keeps the sun from excessively heating the enclosed space or car components. It is also desirable to block the direct sunlight to prevent fading of the car's interior.

Many people turn their vehicle's visors toward the front window if that is the direction from which the sun will shine into the vehicle. The standard visor that is assembled into vehicles when turned against the windshield covers only a small portion of the windshield, hence it is not effective as a deterrent to over-heating the car's interior.

Another method employed to reduce heat buildup is the use of a cloth, such as a towel, draped over parts of the vehicle's interior. This reduces the amount of heat absorbed by the interior components such as a steering wheel, thereby making it easier to grip on a very hot day.

Yet another method to reduce heat buildup is the use of a cardboard shield that fits between the dashboard and the visors. The standard vehicle visors are used to retain the shield in place against the inside of the windshield. It is undesirable to use the shield because among other things the cardboard degrades over time and acquires a strong dried paper odor from the exposure to bright sunlight. Some of these cardboard shields have a "Call Police-Emergency" sign on one side. Frequently the emergency side is inadvertently placed towards the outside indicating an emergency situation when one does not exist. Additionally, the placement, removal, and storage of the cardboard shield present problems to the vehicle's operator.

The available devices made of cardboard or in the form of shades are cumbersome and messy. The process of attaching the device to use it and the process of removal and storage makes it annoying and time-consuming. This is especially the case with the cardboard devices which, in addition, are not durable and lack lustrous appearance.

Some of the available devices which are hung directly on the glass over the dashboard or the side or back windows of automobiles have a kitchen-like appearance. These devices need suction cups to secure them on the windows and additional suction cups are necessary to keep them in the unfolded position. They also lack a refined and finished appearance and in many instances are a deterrent to clear visibility of the road. They may also distract and confuse the driver of the car resulting in unclear perception of moving or approaching vehicles or pedestrians which can result in accidents that are avoidable.

SUMMARY OF THE PRESENT INVENTION

The present invention overcomes these and other drawbacks by providing an adjustable-for-length, "out of the way" self-storing and convenient-to-use sun shade for a vehicle. This invention is designed to reflect and keep out the sun's rays and minimize the heat generated by the sun, while protecting the dashboard and instrument panel in automobiles and yet staying out of the way of the driver and passengers. This invention will also keep the temperature of the car interior from climbing and creating an unpleasant hot car interior. This is very valuable and desirable in geographic areas where heat and sunshine is present most of the year around, and in the summertime in the northern hemisphere.

The device comprises a basic visor for a vehicle which includes an extendible sun shade, pulled from the visor itself. While the vehicle is parked, the shade is pulled out from the visor and thereby shades the vehicle's interior. It can be quickly and readily retracted and stored in the visor itself.

Many types of materials can be used for the shade portion in the preferred embodiment. Mesh weave fabric, solid vinyl or nylon sheets can be used. This will allow a filtered amount of light through the visor. This visor could also be fitted to other windows in the interior of the vehicle.

Very characteristic of this invention is that the shade portion remains inside the window visor in the resting position, and when the shade is pulled down, it comes out of the visor. The visor will act as an anchor for the shade and also as part of the shade system when in use.

The shade portion can be made of reflective vinyl, either transparent or opaque, with different colors, thicknesses and sunscreen characteristics.

When the shade is pulled down, it is kept in the "down" position by applying a small lateral motion to the end of the shade. To roll it up, a small pull down will initiate the spring action to pull the shade up.

The visor housing part of the device will have one portion thicker than the other as shown in the drawings. The thicker portion houses the roller and spring portion of the device.

The visor will be provided as a replacement of existing visors in older cars, but will be provided as standard or optional equipment in new model cars. The visor can be mounted for use on the side and rear windows. An electric motor could be employed to extend and retract the shade.

BRIEF DESCRIPTION OF THE DRAWINGS

A better understanding of the present invention will be achieved upon reference to the following detailed description, when read in conjunction with the accompanying drawings, wherein like reference characters refer to like parts and in which.

DETAILED DESCRIPTION OF THE PREFERRED EMBODIMENT

Figure 1:
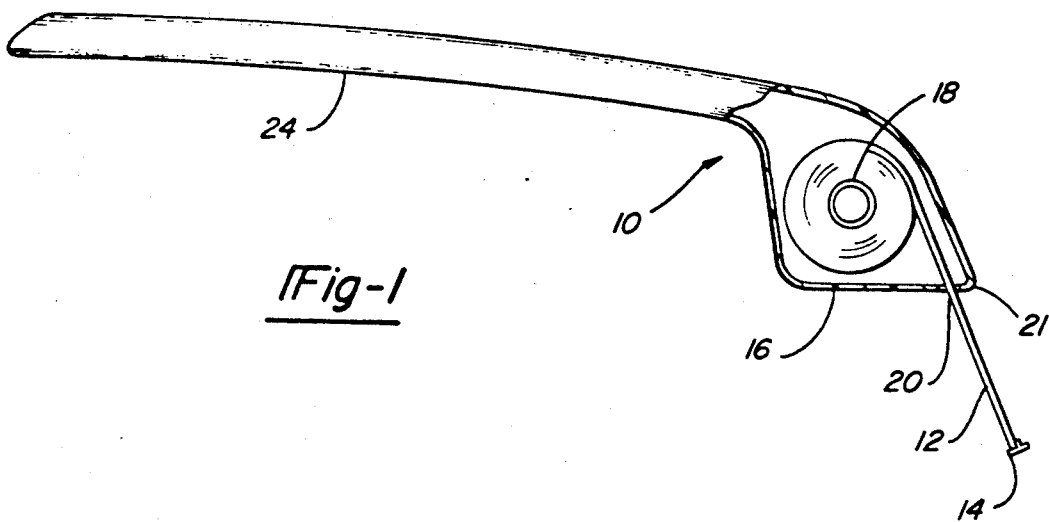
FIG. 1 is a side view of a first embodiment with a partial section.
Figure 2:
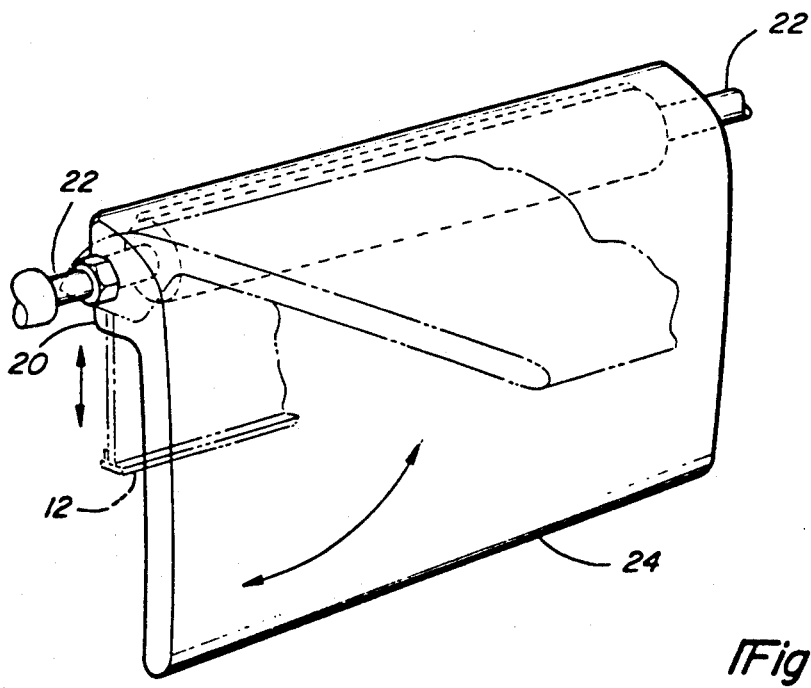
FIG. 2 is a perspective view of FIG. 1 showing the roller inside the visor.

As shown in FIG. 1, this visor incorporates the shade portion 12 into the visor casing 16 itself. The visor 10 here has two positions for use. The lowered use of the regular visor 24 as shown in FIG. 2, places the visor casing shade holder 20 up and out of sight to the driver of the vehicle. By moving the regular visor portion 24 up and out of the way, the casing shade holder 20 is brought into orientation for use.

The shade portion 12 is stored around a standard type of shade roller 18 contained in the visor casing 16. The shade portion 12 extends from the visor casing 16 at the edge of the visor casing 20 which is located along the edge of the visor 10.

A pull tab 14 allows the shade portion 12 to be pulled into an extended position but yet when the shade is retracted, pull tab 14 restrains a grasping edge on the outside of visor casing 16. Shade mounts 22 as best seen in FIG. 2 extend from the roller 18 to allow the visor 10 to be assembled to a vehicle.

Figure 3:
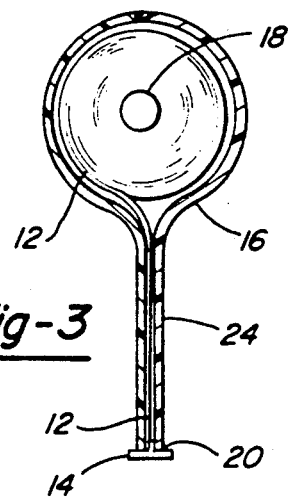
FIG. 3 is a side sectional view of a second embodiment.

The shade 12 retracts inside the visor casing 16 with the pull tab 14 fitting against the edge of the visor casing 20 as shown in FIG. 3. This view shows the shade portion 12 rolled around the roller 18.

Figure 5:
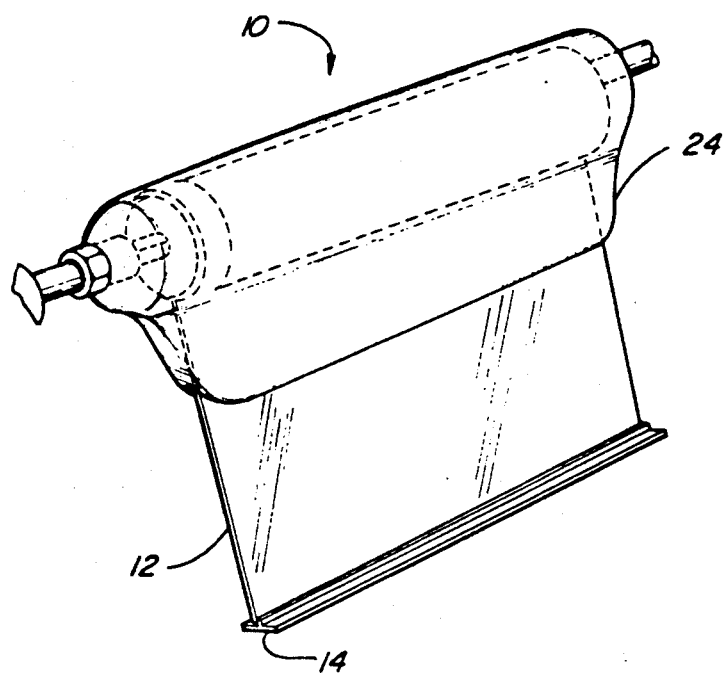
FIG. 5 is a perspective view of the FIGS. 3 and 4.
Figure 4:
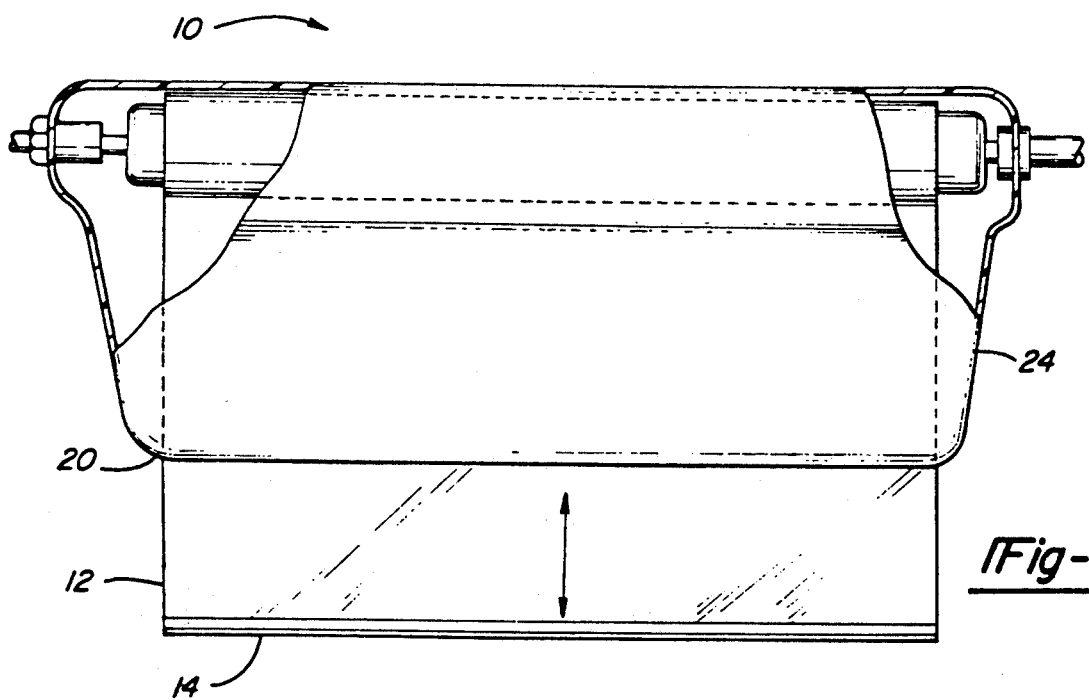
FIG. 4 is a front view of the second embodiment of FIG. 3 with partial sections.

A second version of the shady visor is shown in FIGS. 3, 4 and 5. The shade portion 12 is contained within and extends from the regular visor portion 24.

FIG. 4 shows the visor 10 with the shade 12 partly extending from the edge 20 of the visor. A perspective view of the visor 10 is shown in FIG. 5 with the shade portion 12 extended from the edge 20 of the standard visor portion 24.

Having thus described my invention, many modifications thereto will become apparent to those skilled in the art to which it pertains without deviating from the spirit of the invention as defined by the scope of the appended claims.

I claim:

1. A visor for use in an automotive vehicle comprising:
   a base portion having a pivot axis;
   said base portion having a visor portion and a casing portion;
   said visor portion being positionably rotatable about said pivot axis of said base portion to a multitude of positions;
   said casing portion containing a roller rotatable about an axis coextensive with said pivot axis; and
   a substantially rectangular flexible shade attached at one edge portion thereof to said roller for extension and retraction from said casing portion.

2. The invention as claimed in claim 1 wherein said shade contains means for grasping.

3. The invention as claimed in claim 2 wherein said means for grasping said shade comprises a pull tab.

4. The invention as claimed in claim 1 wherein said shade comprises mesh material.

5. The invention as claimed in claim 1 wherein said shade comprises opaque material.

6. The invention as claimed in claim 1 wherein said shade comprises translucent material.

7. The invention as claimed in claim 2 wherein said grasping means comprises a pull edge.

* * * * *